(12) United States Patent
Mollmann et al.

(10) Patent No.: US 7,920,973 B2
(45) Date of Patent: Apr. 5, 2011

(54) SYSTEM AND METHOD FOR CONVERTING CLEARANCE DATA INTO VIBRATION DATA

(75) Inventors: Daniel Edward Mollmann, Cincinnati, OH (US); Tod R. Steen, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/643,099

(22) Filed: Dec. 21, 2006

(65) Prior Publication Data

US 2008/0149049 A1    Jun. 26, 2008

(51) Int. Cl.
- *G01B 7/14* (2006.01)
- *G01H 17/00* (2006.01)
- *G01M 1/14* (2006.01)
- *G01M 1/00* (2006.01)
- *G01M 1/22* (2006.01)
- *G06F 19/00* (2006.01)
- *G06F 17/40* (2006.01)

(52) U.S. Cl. .......... 702/56; 73/66; 73/457; 73/460; 73/570; 340/683; 340/686.6; 702/158; 702/189

(58) Field of Classification Search .......... 73/152.16, 73/152.32, 152.47, 66, 114.01, 114.77, 152.01, 73/152.02, 152.18, 152.29, 152.43, 152.46, 73/432.1, 455, 457, 460, 570, 865.8, 865.9; 702/33, 56, 1, 34, 127, 155, 158, 166, 182, 702/183, 187, 189; 318/490; 340/500, 540, 340/679, 683, 686.1, 686.2, 686.6, 945, 963; 415/118; 701/1, 3, 14, 99, 100

See application file for complete search history.

(56) References Cited

U.S. PATENT DOCUMENTS

| | | | | |
|---|---|---|---|---|
| 2,799,015 A * | 7/1957 | Bell | .............................. | 340/683 |
| 3,201,776 A * | 8/1965 | Morrow et al. | ................ | 340/683 |
| 3,242,321 A * | 3/1966 | Chope | ........................... | 702/185 |
| 4,412,212 A * | 10/1983 | Kolegraff et al. | ............. | 340/684 |
| 4,607,529 A * | 8/1986 | Morey | ........................... | 73/660 |
| 5,119,036 A * | 6/1992 | Rickards et al. | .............. | 324/662 |
| 5,696,444 A * | 12/1997 | Kipp et al. | ................ | 324/207.23 |
| 5,739,524 A * | 4/1998 | Fally | ........................ | 250/227.11 |
| 6,107,794 A * | 8/2000 | Kipp et al. | ................ | 324/207.23 |
| 7,305,158 B2 * | 12/2007 | Jeffers et al. | .................... | 385/15 |
| 2006/0122798 A1 * | 6/2006 | Teolis et al. | ..................... | 702/66 |

FOREIGN PATENT DOCUMENTS

EP    0 692 700 A1 *    1/1996
JP    2008-180697 A  *    8/2008

* cited by examiner

*Primary Examiner* — Edward R Cosimano
(74) *Attorney, Agent, or Firm* — Trego, Hines & Ladenheim, PLLC

(57) ABSTRACT

Embodiments described herein generally relate to a method of measuring the vibration of an aircraft engine. One embodiment herein provides an engine monitoring system either connected to and/or positioned in close proximity to an aircraft engine. Also provided is a clearance measuring device within the engine monitoring system. The clearanceometer collects clearance data that is later converted into vibration data.

11 Claims, 3 Drawing Sheets

SYSTEM AND METHOD FOR CONVERTING CLEARANCE DATA INTO VIBRATION DATA

FIELD OF THE INVENTION

The invention relates to a system and method for monitoring vibration. More specifically, the invention relates to a system and method for monitoring vibration that uses a device to collect clearance data and converts the clearance data into vibration data to determine whether and to what extent vibration exists.

BACKGROUND OF THE INVENTION

Machine vibration is a common byproduct of machine operation. For many machines there is an acceptable range of allowable vibration associated with proper machine functioning. For machines with rotatable parts, such as rotary engines for example, this is especially true. In order for machines and especially for rotary engines to function properly proper clearance between its various internal parts must be maintained. In various rotating engines, a rotor or rotating member is closely confined within an outer housing or casing. The distance between the rotor and casing is typically quite small. It is critical that the gap or distance between the casing and the rotating member, referred to as running clearance, be maintained within predetermined acceptable limits in order to ensure the uninterrupted, effective operation of the machine.

An example of such a rotary engine discussed above is a hot gas turbine engine. An exemplary hot gas turbine engine of the type described herein is an aircraft gas turbine engine. In such an engine, a turbine wheel or rotor having a circumferentially extending row of spaced apart blades extending therefrom is closely confined within a casing. The casing encircles the rotor to define a hot gas flow path in combination with the blades. The hot gas flows along the flowpath and impacts the blades causing the turbine wheel to rotate and this rotation in turn rotates the turbine wheel.

In the example of the gas turbine engine, preservation of a minimum clearance gap during engine operation is necessary to avoid rotational contact between the blades and the casing as the blades rotate within the casing. If the clearance is too small, the blades will contact the casing. Such contact could produce component part damage, engine failure and a loss of power. Conversely, if the clearance is allowed to become too large, the fuel consumption of the gas turbine will increase. Therefore it is necessary to closely monitor the running clearance of a turbine wheel during its operation.

Typical commercial aircraft engines use accelerometers and an associated signal conditioning system to monitor engine vibration, and these systems provide an indication of such vibration to the flight crew. Most current aircraft vibration monitoring systems locate the vibration monitoring computer in the electronics bay in the body of the aircraft while the accelerometers are located on the engine, and typically on the outer casing of the engine. Also, initial signal conditioning units, such as amplifiers, may be located on the engine, in the engine strut, or in the aircraft's electronics bay.

While accelerometers are commonly used to track and record engine vibration, their use is accompanied by several shortcomings. The accelerometer measures vibration at the engine casing rather than directly at the rotor. The accelerometers measure acceleration at the engine casing. The casing is a secondary source of vibration. It is more desirable to measure vibration at the primary vibration source of the rotary engine rather than at the secondary vibration source. Also, using the accelerometer is an additional system component that adds weight to the engine. Weight considerations are always of paramount importance for aircraft due to their direct negative affect on engine fuel consumption and efficiency.

What is needed is a system for more accurately tracking vibration where the system does not negatively affect the operating efficiency of the engine or other sensed device.

BRIEF DESCRIPTION OF THE INVENTION

In one embodiment, the invention comprises a method for measuring vibration in a device. The method comprises providing a monitoring system for vibration, the monitoring system having a clearance measuring device, the clearance measuring device collecting clearance data that is converted into vibration data.

In another embodiment, the invention provides an engine monitoring system for measuring the vibration of a rotary engine. The engine monitoring system comprises a clearanceometer for collecting clearance data. The clearance data is in the form of an analog signal. The system includes a microprocessor linearizes the analog signal. Once linearized, the analog signal is converted into a DC signal. Vibration data is then extracted from the DC signal.

In yet another embodiment, the invention provides a gas turbine engine that includes an engine monitoring system. The engine monitoring system comprises a clearanceometer for collecting clearance data. The clearance data takes the form of an analog signal. The engine monitoring system has a clearance computer that linearizes the analog signal. Once linearized, the analog signal is converted into a DC signal. Vibration data is then extracted from the DC signal.

Several advantages are realized by using a clearance measuring device as part of an engine monitoring system that measures the clearance between the blade tip and the engine casing and then converts that data into vibration data. First, the system of the present invention weighs less than conventional accelerometer based systems. Where a gas turbine engine also uses an accelerometer for measuring vibration, the accelerometer and its attendant weight may be removed because of this invention. Second, the present system provides two functions instead of one; namely, vibration monitoring and clearance monitoring. Third, data collected from a clearance measuring device provides a more accurate means of monitoring engine vibration. A clearance measuring device directly measures the vibration of the rotor, which is the source of the vibration, rather than the casing surrounding the rotor that is measured by an accelerometer.

BRIEF DESCRIPTION OF THE DRAWINGS

While the specification concludes with claims particularly pointing out and distinctly claiming the invention, it is believed that the embodiments set forth herein will be better understood from the following description in conjunction with the accompanying figures, in which like reference numerals identify like elements, and in which:

DETAILED DESCRIPTION OF THE SPECIFICATION

Embodiments described herein generally relate to a system and method for measuring the vibration of a machine, in particular a rotary engine and most particularly an aircraft engine. One embodiment comprises providing an engine monitoring system either connected to and/or positioned in close proximity to an aircraft engine, e.g., a high pressure gas turbine. A clearance measuring device is provided within the engine monitoring system and collects data relating to the clearance associated with interrelated parts of the engine. Preferably, the clearance measuring device used for the invention herein is a clearanceometer of the type well-known by persons of skill in the art. Clearance measuring data is collected in analog signal form. The clearance data represents the distance between the turbine blade tips and the engine casing. Once collected, the analog signal containing clearance data is processed and the clearance data is converted into vibration data by one or more algorithms through at least one central processing unit. The vibration data may then be stored or displayed on an output device. For example, vibration data may be read by a computer, and displayed for review by a pilot, engine operator or maintenance person.

Though one embodiment of the invention is directed to use of the vibration monitoring system with a high pressure gas turbine, one of skill in the art will recognize the immediate application of the invention to any number of devices having, and more specifically to devices having relatively moving parts. Also, persons of skill in the art will readily recognize that the invention is applicable across a broad range of industries using rotational devices, and in particular rotational turbine engines, including but not limited to aeronautics, energy, maritime, chemical manufacturing, and industrial manufacturing.

Figure 1:
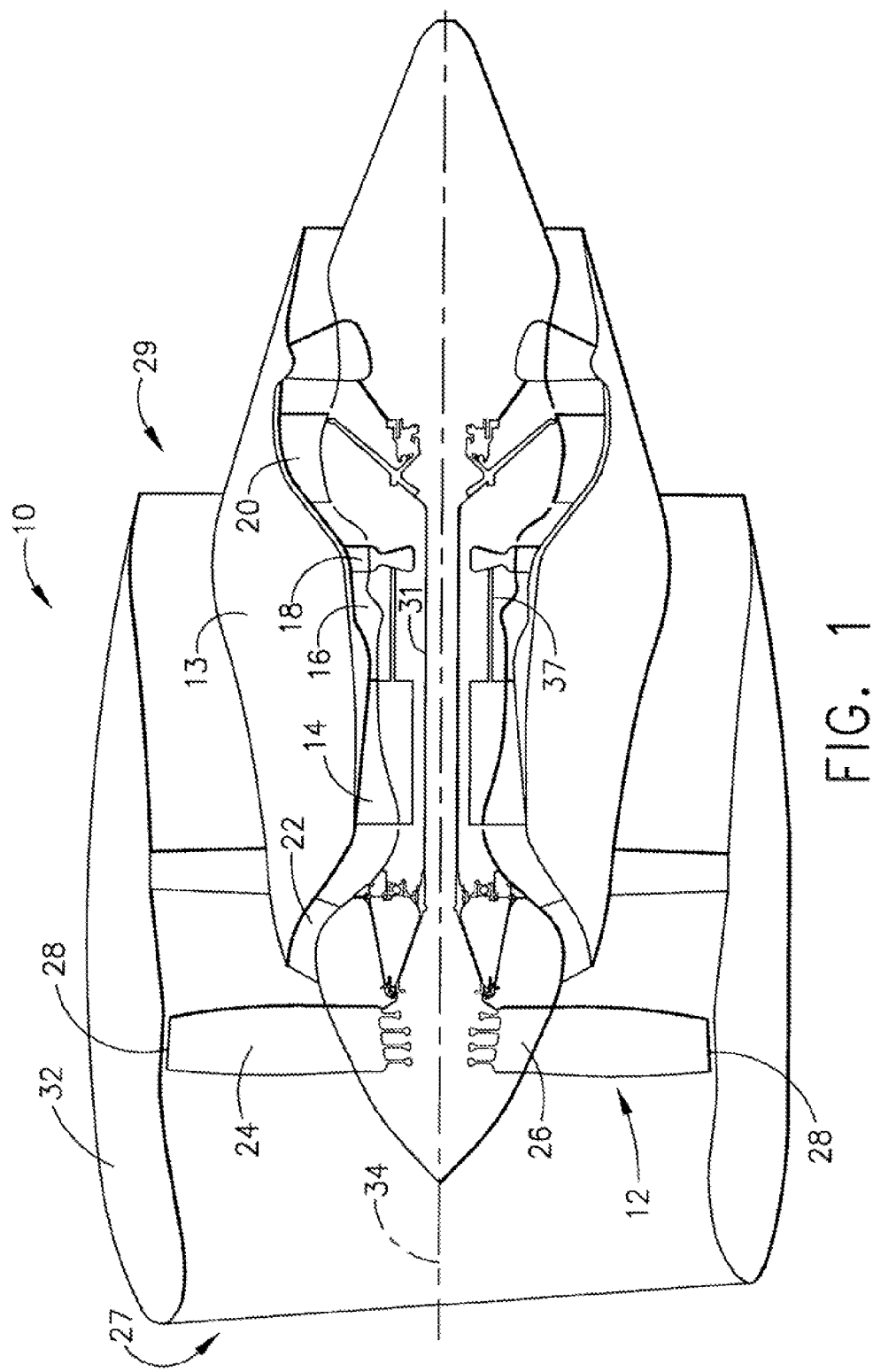
FIG. 1 is a schematic representation of a high pressure gas turbine.

Generally, the invention may be used in any application where vibration determination can be made by sensing the clearance between parts in a machine like a rotary engine. FIG. 1 is a schematic illustration of such a machine and more specifically is gas turbine engine 10. Gas turbine engine 10 includes fan assembly 12, core engine 13, high pressure compressor 14, and combustor 16. Engine 10 also comprises high pressure turbine 18, low pressure turbine 20, and booster 22. Fan assembly 12 includes an array of fan blades 24 extending radially outward from rotor disc 26. Each fan blade has a blade tip 28. Engine 10 has an intake side 27 into which air flows into the engine and an exhaust side 29 through which air flows out of the engine. Engine rotor 26 is substantially enclosed by fan case 32. An exemplary gas turbine engine of the type described herein is a GE90-115B that is available from General Electric Company, Cincinnati, Ohio. Fan assembly 12 and turbine 20 are coupled using first rotor shaft 31. Compressor 14 and turbine 18 are coupled using second rotor shaft 37.

During operation, air flows axially through fan assembly 12, in a direction that is substantially parallel to central axis 34 extending through engine 10. The air is compressed by booster 22, and this initially compressed air is then further compressed by high pressure compressor 14. The highly compressed air is delivered to combustor 16 where it is mixed with fuel. Combustion gases (not shown in FIG. 1) from combustor 16 drive turbines 18 and 20, and turbine 20 drives fan assembly 12 by way of shaft 31.

Figure 2:
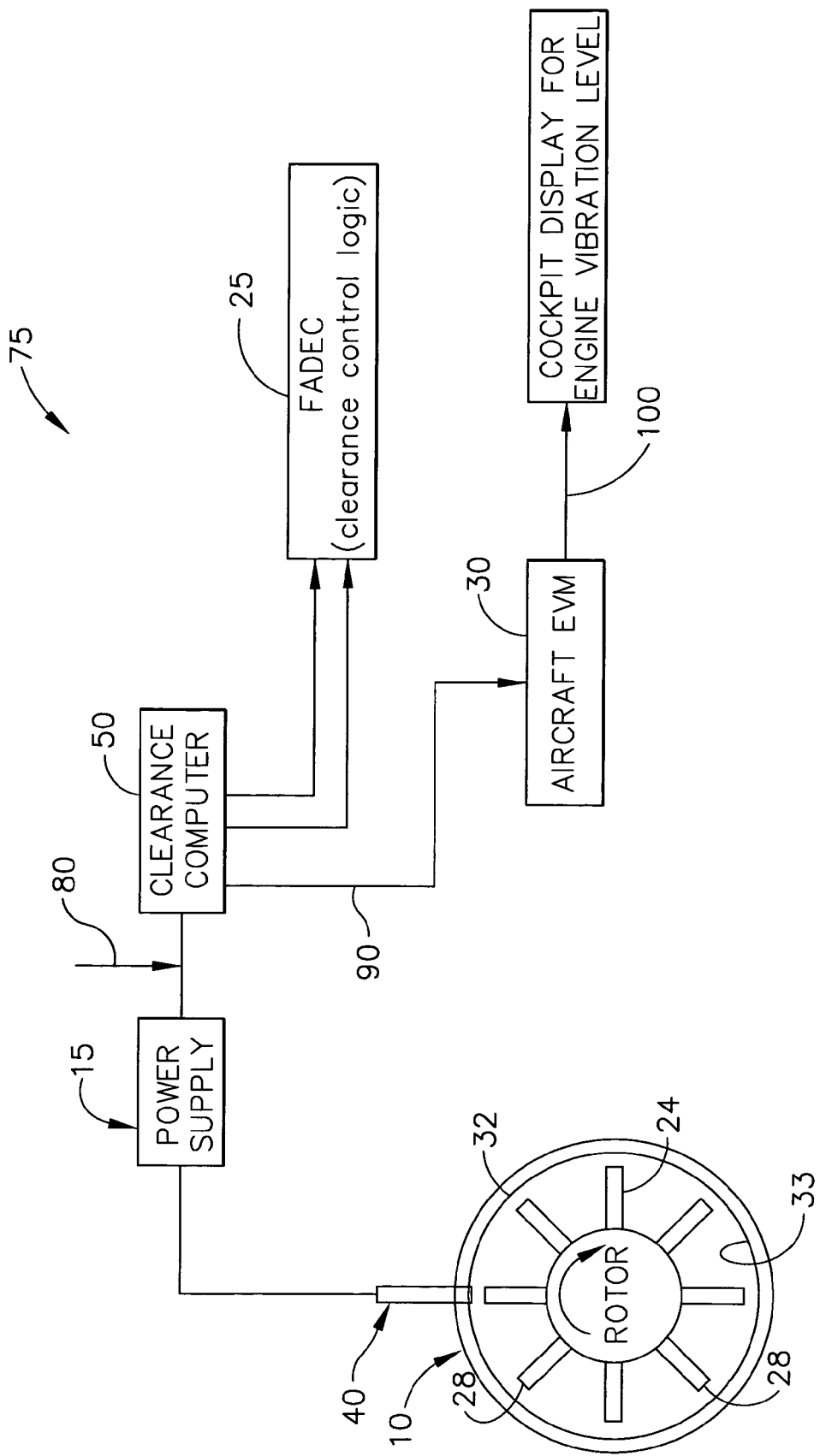
FIG. 2 is a schematic representation of an engine monitoring system containing a clearanceometer in combination with the high pressure turbine of FIG. 1.

FIG. 2 provides a schematic representation of one embodiment of the monitoring system of the invention. The system for monitoring engine vibration is identified at 75 in FIG. 2. The system comprises clearance measuring device 40 located proximate the rotor periphery. For purposes of describing the preferred embodiment of the invention, the clearance measuring device is a clearanceometer. As the description proceeds device 40 may be referred to as either a clearanceometer or a clearance measuring device. Clearanceometer 40 is located at least partially within casing 32 and measures the distance between each blade tip 28 and the inner casing wall 33 as each blade tip 28 passes clearanceometer 40. Clearanceometer 40 may be comprised of any suitable device for measuring clearances between two relatively moving parts.

In practice, a signal is generated by clearanceometer 40 with each pass of tip 28 of turbine blade 24. Any number of signals may be produced during operation. For example, one signal may be produced with each complete revolution of rotor 26. Also, each of the blades 24 may pass clearanceometer 40 and thereby produce its own signal. Or signals may be produced by fewer than all of the blades as the selected blade tips pass the clearanceometer. Although multiple signals may be produced during operation, for purposes of clarity as the description proceeds one blade and signal will be described. The signal produced by the clearanceometer 40 is an analog signal in the form of an alternating current (AC). The analog signal travels from clearanceometer 40 to power supply 15. The power supply 15 of system 75 is located in signal receiving relation with the clearanceometer 40. Preferably, power supply 15 also contains an integral signal conditioner that stabilizes and/or strengthens the analog signal. It should be understood that rather than being integrated with power supply 15, the signal conditioner may be a separate component from power supply 15. Once conditioned, the analog signal travels to clearance computer 50.

Clearance computer 50 comprises a conventional, well-known microprocessor and is powered by power supply 15. The power supply also provides power to the clearanceometer. The computer 50 is located in signal receiving relation with clearanceometer 40 and power unit 15. During use, signals comprising clearance data are communicated to the clearance computer 50 where the signals are processed. In practice, the processing is comprised of clearance computer 50 linearizing the analog signal produced from each blade tip 28. The analog signal entering clearance computer 50 from power unit 15 is not linearly proportional to the clearance distance between casing 32 and turbine blade tip 28. Thus, clearance computer 50 modifies the voltage of the analog signal to make it linear. Clearance computer 50 may further filter or provide additional conventional signal processing as required, such as, but not limited to, signal strengthening by amplification. Once processed, the signal leaving clearance computer 50 is still in analog form and is a linearized alternating current (AC) signal.

The linearized analog signal is communicated from clearance computer 50 to a second microprocessor based system 30. In system 30, the linearized AC or analog signal is transformed into a direct current (DC) signal. System 30 is a second computer programmed to effect the desired AC to DC signal transformation. Also, an algorithm programmed into system 30 transforms the clearance data represented by the linearized analog signal into vibration data. More specifically, system 30 converts the analog AC signal into a DC signal and extracts vibration data from the DC signal. This conversion is achieved when system 30 receives the analog signal in its complicated form and extracts from it the amplitude of the rotor vibration at a low pressure rotor frequency, high pressure rotor frequency, and any other frequency of interest. The term "complicated" means that many types of vibratory noise may be superimposed onto the analog signal.

System 30 preferably uses one or more Fourier transform calculations to extract the amplitudes at the appropriate rotor frequencies to derive the vibration data. As indicated above, within system 30 the signal created by clearanceometer 40 is processed by an algorithm and thereby transformed from an AC signal to a DC signal. Suitable algorithms that may be applied to the analog signal received from the clearanceometer 40 include, but are not limited to, a fast Fourier transform and/or a discrete Fourier transform. Such an algorithm is readily applied through a computer program and thereby processed by a suitable central processing unit known in the art.

A suitable Fourier transform useful for converting data from clearanceometer 40 is the discrete Fourier transform (DFT) also referred to as the finite Fourier transform. The discrete Fourier transform is a Fourier transform widely employed in signal processing and related fields to analyze the frequencies contained in a sampled signal. The DFT can be computed using a fast Fourier transform (FFT) algorithm. An exemplary discrete Fourier transform formula is the following:

$$X_k = \sum_{n=0}^{N-1} x_n e^{-\frac{2\pi i}{N}kn} \quad k = 0, \ldots, N-1$$

where e is the base of the natural logarithm, i is the imaginary unit ($i^2=-1$), and $\pi$ is Pi (namely, 3.142). The transform is sometimes denoted by the symbol F, as in X=F(x) or Fx. A fast Fourier transform (FFT) is an algorithm that computes the discrete Fourier transform (DFT) and its inverse. FFTs are useful in a wide variety of applications including digital signal processing, solving partial differential equations, or algorithms for quickly multiplying large integers.

Figure 3:
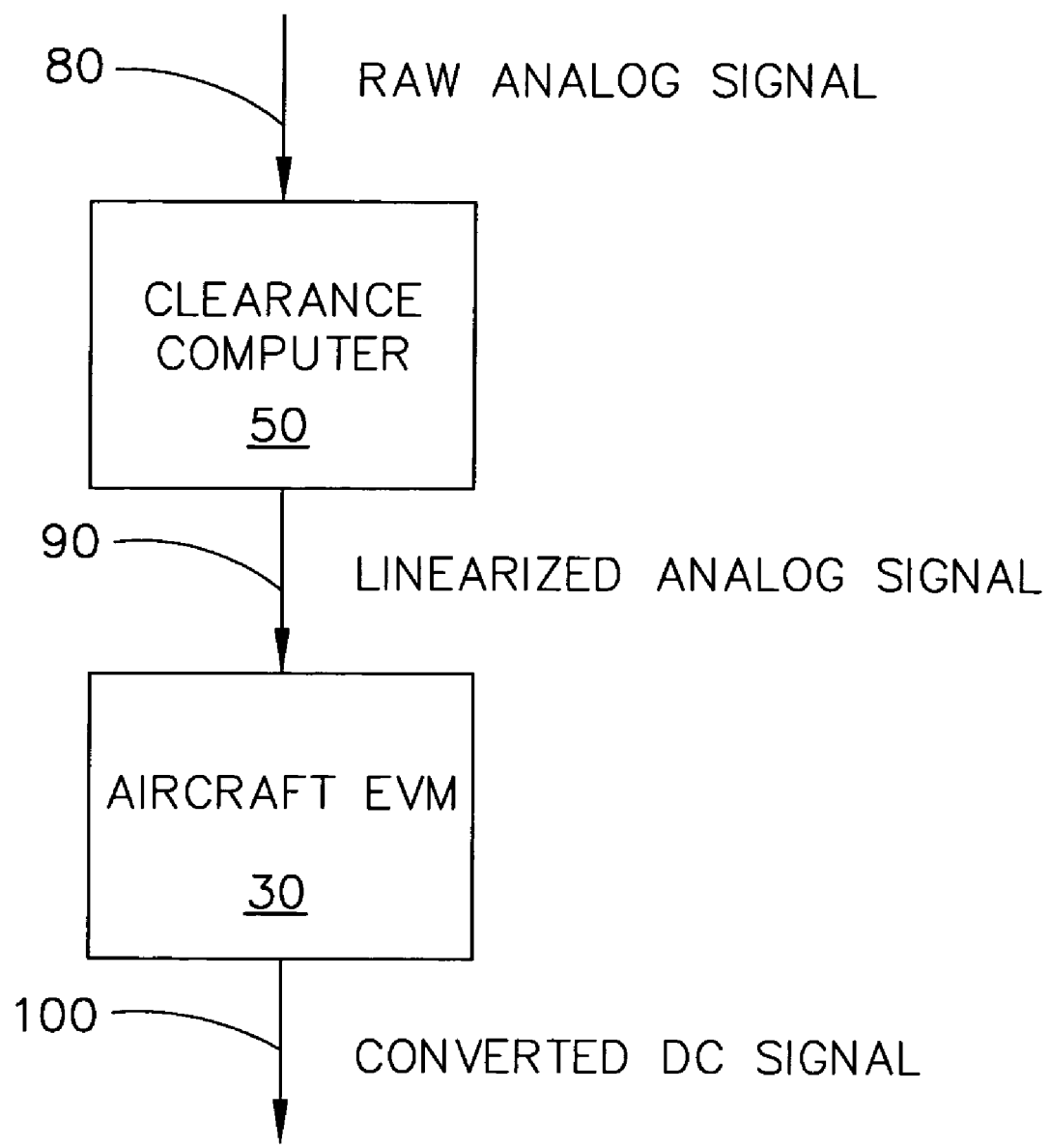
FIG. 3 is a schematic representation of an engine monitoring system showing the transformation process of the signal created by the clearanceometer and then transformed into vibration data.

FIG. 3 provides a schematic representation of an engine monitoring system showing the transformation process of the signal created by clearanceometer 40 and then transformed into vibration data. As shown, the raw analog signal 80 collected from clearanceometer 40 is communicated to clearance computer 50. The analog signal 80 is linearized, as been discussed herein previously, and then communicated as linearized analog signal 90 to aircraft monitoring system 30. At aircraft monitoring system 30 the linearized analog signal 90 is converted into a DC signal by one or more algorithms, e.g., a Fourier transform type of algorithm. The converted DC signal 100 is then communicated to a reader as vibration data.

In an alternative embodiment, the transformation of the analog signal from an AC signal into a DC signal and the extraction of vibration data therefrom could occur within a single computer such as clearance computer 50.

Clearance computer 50 and system 30 could each perform the signal transformation and data extraction tasks, with one device acting as a back-up to the other. For example, if either clearance computer 50 or system 30 were to fail, either system could itself separately transform the AC signal into a DC signal and then extract the vibration data from the DC signal. Once the data is extracted, either system could then communicate it to an aircraft monitoring system or to one or more system operators. Where the data transmission occurs outside of a measured aircraft, such transmission can be made through any one of several known ways in the art including, but not limited to, wireless communication by satellite transmission, radio wave transmission, infra red transmission, or other known suitable communication methods.

When communicated by clearance computer 50, the clearance data may also be communicated to a Full Authority Digital Electronic Control system 25 (i.e., a FADEC) and kept without further transformation in its analog form (See FIG. 2). FADEC 25 is a system consisting of a digital computer (called EEC/Electronic Engine Control/or ECU/Electronic Control Unit/) and its related accessories which control all aspects of aircraft engine performance. For example, the FADEC 25 performs numerous control and monitoring functions such as Variable Stator Vanes (VSV's) and Variable Bleed Valves (VBV's) control, cabin bleeds, engine starting and re-starting, turbine blade and vane cooling, blade tip clearance control, thrust reverser control, engine health monitoring, oil debris monitoring and vibration monitoring.

Clearance data may be transformed into vibration data in real-time or in substantially real-time. The term "real-time" means time that is in the present for an event presently happening. Or, historical clearance data may be transformed into vibration data. Historical clearance data is clearance data that is collected and stored within clearance computer 50 without immediate transformation, through one or more algorithms, into vibration data. Later, at a user's preference or by a pre-scheduling function within clearance computer 50 or elsewhere within system 30, the clearance data may be transformed into vibration data.

While particular embodiments of the present invention have been illustrated and described, it would be obvious to those skilled in the art that various other changes and modifications can be made without departing from the spirit and scope of the invention.

What is claimed is:

1. A method for measuring vibration in a device, the device comprising a first member and a second member, the vibration measured using a monitoring system having a clearance measuring device, the method comprising:
   collecting clearance data in analog signal form representing the clearance between the first and second members, and converting the clearance data into vibration data;
   wherein the clearance data is in the form of an analog signal, the converting comprised of converting the analog signal to a linearized AC signal, converting the AC signal to a DC signal and applying an algorithm to the DC signal.

2. The method of claim 1 wherein the device is a rotary engine, the first member being a rotor having at least one rotor blade, the at least one blade comprising a blade tip, and said second member being a casing positioned about the rotor and the blades such that the casing encloses said rotor and said blades, said collecting further comprising collecting the clearance data when the blade tip is located proximate the clearance measuring device.

3. The method of claim 1 wherein the collected data is communicated to a processor in the form of a signal before the data is converted.

4. The method of claim 1 wherein converting includes applying an algorithm to the clearance data.

5. The method of claim 1 wherein the converting is comprised of applying a Fourier transform type of algorithm to the clearance data.

6. The method of claim 1 further comprising communicating the vibration data to a reader.

7. The method of claim 1 wherein converting is done in real-time.

8. A gas turbine engine having a rotor, at least one blade positioned on said rotor, said at least one blade having a blade tip, a casing enclosing rotor and blades; and a monitoring system, the monitoring system comprising a clearance measuring device for measuring the clearance between the casing and at least one rotor blade, in the form of a signal; and a processor for converting clearance data signal into a DC signal and then extracting vibration data from the DC signal.

9. The gas turbine engine of claim 8 wherein said clearance data is collected for each said blade as each said blade tip approaches said clearance measuring device.

10. The gas turbine engine of claim 8 wherein said clearance measuring device is a clearanceometer.

11. The combination of claim 8 wherein said engine monitoring system further comprises a component for communicating said vibration data to a reader.

* * * * *